(12) United States Patent
Fragstein et al.

(10) Patent No.: US 12,731,345 B2
(45) Date of Patent: Sep. 8, 2026

(54) MIXED-REALITY SYSTEM AND METHODS

(71) Applicant: Karltex Machine, Inc., Orange, TX (US)

(72) Inventors: Sig Fragstein, Orange, TX (US); Donnie L. Cobb, Orange, TX (US); Carl Johnson, Orange, TX (US); Cristobal Bernal, Orange, TX (US)

(73) Assignee: Karltex Machine, Inc., Orange, TX (US)

( * ) Notice: Subject to any disclaimer, the term of this patent is extended or adjusted under 35 U.S.C. 154(b) by 285 days.

(21) Appl. No.: 18/486,293

(22) Filed: Oct. 13, 2023

(65) Prior Publication Data

US 2024/0127560 A1 Apr. 18, 2024

Related U.S. Application Data

(60) Provisional application No. 63/416,389, filed on Oct. 14, 2022.

(51) Int. Cl.

| | |
|---|---|
| ***G06T 19/00*** | (2011.01) |
| ***G02B 27/00*** | (2006.01) |
| ***G02B 27/01*** | (2006.01) |
| ***G06F 3/01*** | (2006.01) |
| ***G06V 20/20*** | (2022.01) |
| ***G09B 5/02*** | (2006.01) |

(52) U.S. Cl.
CPC ........ *G06T 19/006* (2013.01); *G02B 27/0093* (2013.01); *G02B 27/0101* (2013.01); *G06F 3/011* (2013.01); *G06V 20/20* (2022.01); *G09B 5/02* (2013.01); *G02B 2027/0141* (2013.01)

(58) Field of Classification Search
CPC ........ G06T 19/006; G06F 3/011; G06F 3/017; G06V 20/20; G09B 5/02; G02B 27/017
See application file for complete search history.

(56) References Cited

U.S. PATENT DOCUMENTS

| | | | | |
|---|---|---|---|---|
| 2018/0350056 | A1* | 12/2018 | Cardenas Bernal . | G01N 21/954 |
| 2019/0362556 | A1* | 11/2019 | Ben-Dor ................. | G06F 3/167 |
| 2020/0298523 | A1* | 9/2020 | Fragstein .............. | B30B 9/3021 |
| 2021/0124168 | A1* | 4/2021 | Xiao ........................ | G06F 3/013 |
| 2021/0134065 | A1* | 5/2021 | Ramani ................. | G06F 3/0346 |
| 2021/0321062 | A1* | 10/2021 | Mori ......................... | G01C 3/00 |
| 2021/0335145 | A1* | 10/2021 | Denn ................... | G02B 27/017 |
| 2023/0205416 | A1* | 6/2023 | Kumami ................. | G06F 3/017 |

* cited by examiner

*Primary Examiner* — Grace Q Li
(74) *Attorney, Agent, or Firm* — Lathrop GPM LLP; Alex Shtraym

(57) ABSTRACT

The invention relates generally to a system and methods by which physical and digital objects co-exist and can be interacted with in real time. More specifically, the system may facilitate outputting interactive content associated with one or more components of a rubber finishing line, such as a baler machine. The system may include a wearable device—such as a hat or helmet—having a plurality of sensors for receiving spatial telemetry data. Based on the data received, the system may identify one or more physical objects and generate content including one or more virtual objects that may be output to a user via a display of the wearable device. Advantageously, the system may facilitate training a user to operate a component of the rubber finishing line or assisting a user with maintaining or repairing a component of the rubber finishing line.

20 Claims, 16 Drawing Sheets

REMOVE SIDE WEAR STRIP

MIXED-REALITY SYSTEM AND METHODS

CROSS-REFERENCE TO RELATED APPLICATIONS

This application is a nonprovisional application claiming priority to U.S. Provisional Application No. 63/416,389, filed Oct. 14, 2022, and which application is incorporated herein by reference.

FIELD OF INVENTION

The present invention relates generally to mixed-reality and, more specifically, to a system and methods by which physical and digital objects co-exist and can be interacted with in real time.

BACKGROUND OF THE INVENTION

Augmented reality is a technology that allows virtual imagery to be mixed with a real world physical environment. For example, an augmented reality system can be used to insert an image of a piece of furniture into a user's view of a room so that the user sees the furniture in the room.

BRIEF DESCRIPTION OF THE DRAWINGS

The preferred embodiments of the invention will be described in conjunction with the appended drawings provided to illustrate and not to limit the present invention, where like designations denote like elements, and in which.

DETAILED DESCRIPTION

The present invention relates generally to mixed-reality and, more specifically, to a system and methods by which physical and digital (or digital twin) objects co-exist and can be interacted with in real time.

Figure 1:
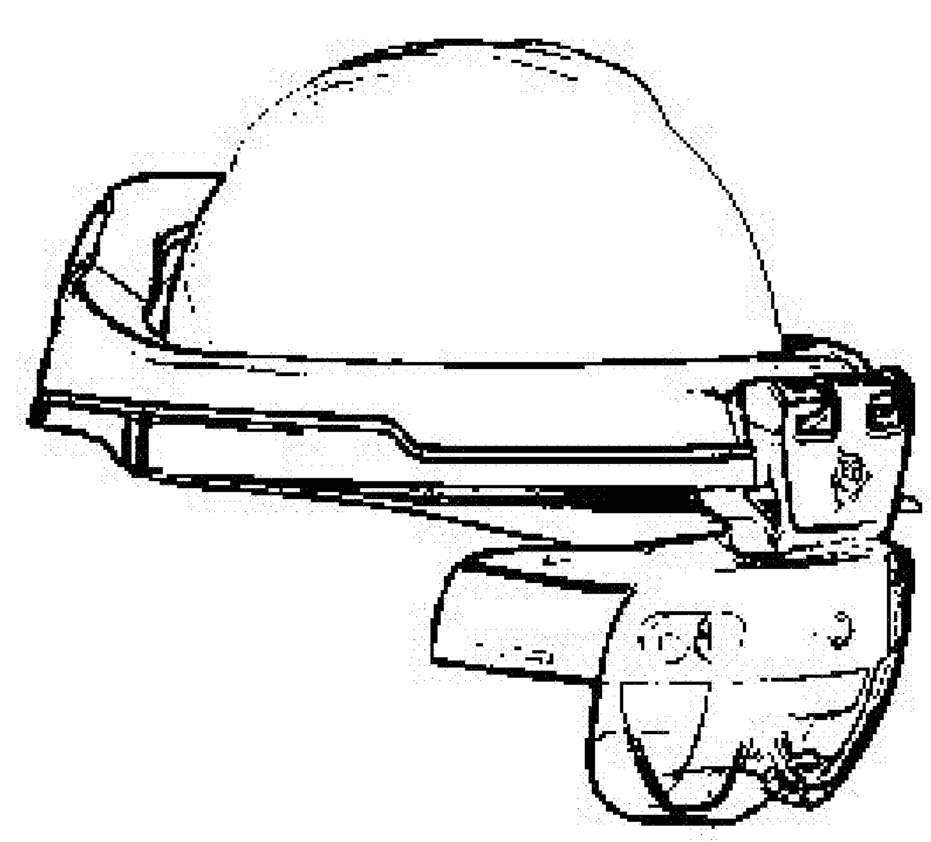
FIG. 1 illustrates an exemplary wearable mixed reality device.

FIG. 1 illustrates an exemplary wearable device 100 according to one or more embodiments. Wearable device 100 may be a computing device that is configured to facilitate displaying various environments, such as virtual reality, augmented reality, and/or mixed-reality. Wearable device 100 may be used in various industries for training, maintenance, design, and production.

As shown, wearable device 100 may include a head-mounted display (HMD) that may be positioned over a user's eyes. While wearable device 100 is shown as being attached to a hat or helmet, other configurations are contemplated. For instance, straps or bands, such as those used with glasses or goggles, may permit wearable device 100 to rest on a user's head.

The HMD of wearable device 100 may include a partial see-through display. The partial see-through display may be a stereoscopic display including, for example, a left panel and a right panel or single panel of a suitable shape. Panels may be of any shape including, but not limited to, round, oval, square, or other shapes including lens-shaped.

In some aspects, wearable device 100 may also include a protective eye cover or shield. The display and/or cover may include one or more regions that are transparent, opaque, or semi-transparent. Any of these portions may further be configured to change transparency by suitable means. As such, the wearable device 100 may be configured to be used for both augmented reality situations and virtual reality situations.

Wearable device 100 may further include a controller, as detailed below. Controller may include, for example, a logic, a memory, and a communication system. Communication system may include, for example, audio input/output hardware having noise cancelling technology. An audio codec of communication system may receive spoken information from a user and convert it to usable digital information. Audio codec may likewise generate audible sound for a user, such as through a speaker, in a handset of wearable device 100. Such sound may include sound from voice telephone calls, may include recorded sound and may also include sound generated by applications operating on device 100.

The logic may include one or more processors configured to execute software instructions. The one or more processors may be operatively coupled to the display and related circuitry and components. For example, the processor, through use of the logic and memory, may be configured to provide various images, which may be generated from 2-D and/or 3-D drawings, and/or videos, i.e., moving or motion pictures or series of images, to the display, receive sensory signals from one or more sensors, and engage in control processes.

Sensors of wearable device 100 may be configured to receive, track, and store various data, including, among other things, spatial telemetry data. The spatial telemetry data may include, for example, movement of the user through the space, eye movement, hand movement, and/or the like. The various data collected by mixed-reality devices may be received by another device, which may process the data to, for example, combine the data and perform analytics on the data. The analytics may capture various data points, including, for each user, what the user is doing or how efficient the user is, time spent on a project, where the user was looking, failure to complete a project, and various other interactions between the user, the mixed-reality device, and the physical environment. Examples of sensors of wearable device 100 may include location sensors, optical sensors (e.g., one or more cameras), gaze detection, microphones, and speakers.

Display of wearable device 100 may be configured to display holograms, such as holograms superimposed on a physical environment. Display may be a stereo display that is at least partially see-through, and the hologram may be positioned to appear at a desired depth and position within the user's field of view. It is further contemplated that, wearable device 100 may be configured to capture images, which may then be superimposed on a physical environment.

Figure 2:
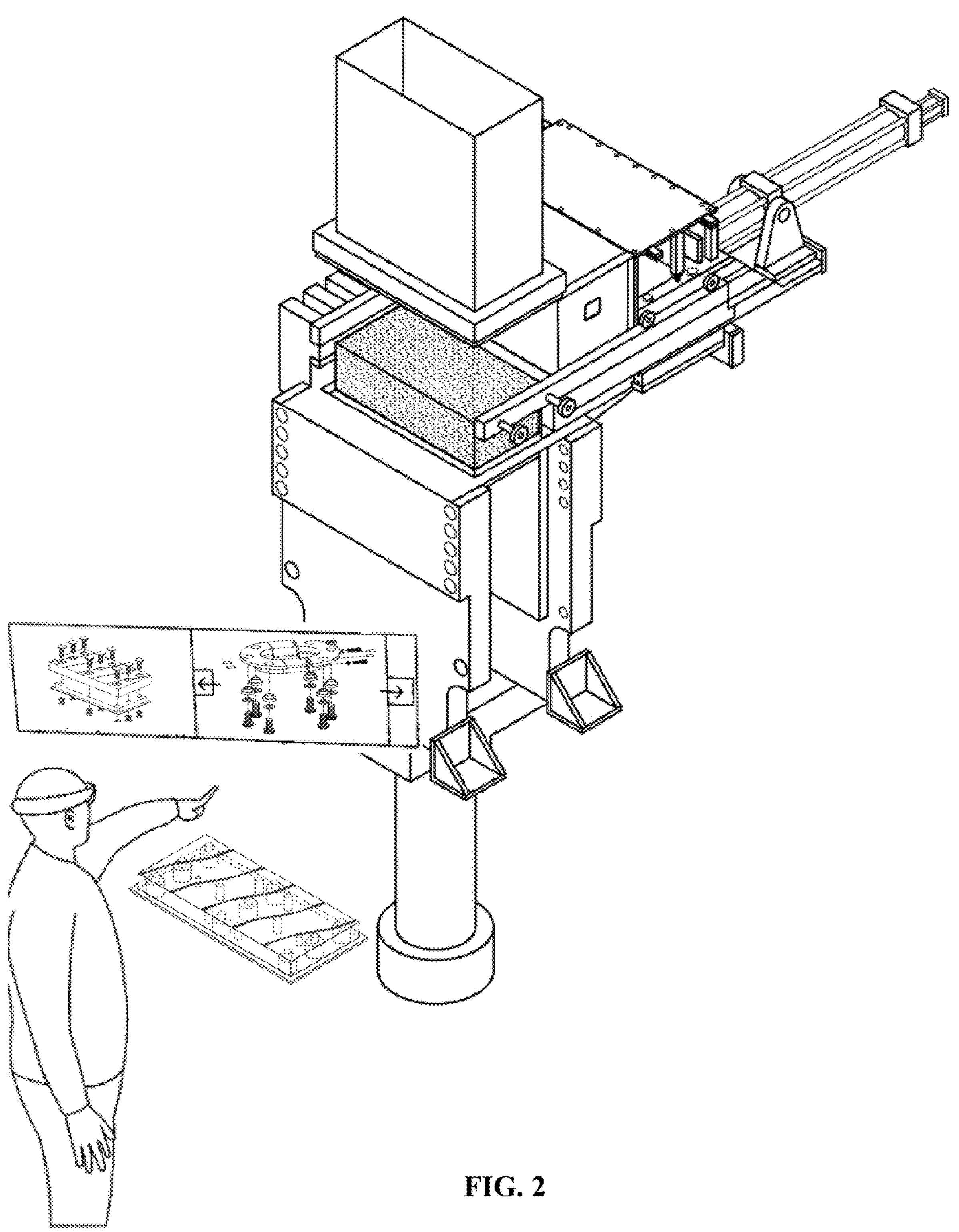
FIG. 2 illustrates an exemplary use of a wearable mixed reality device.
Figure 3A:
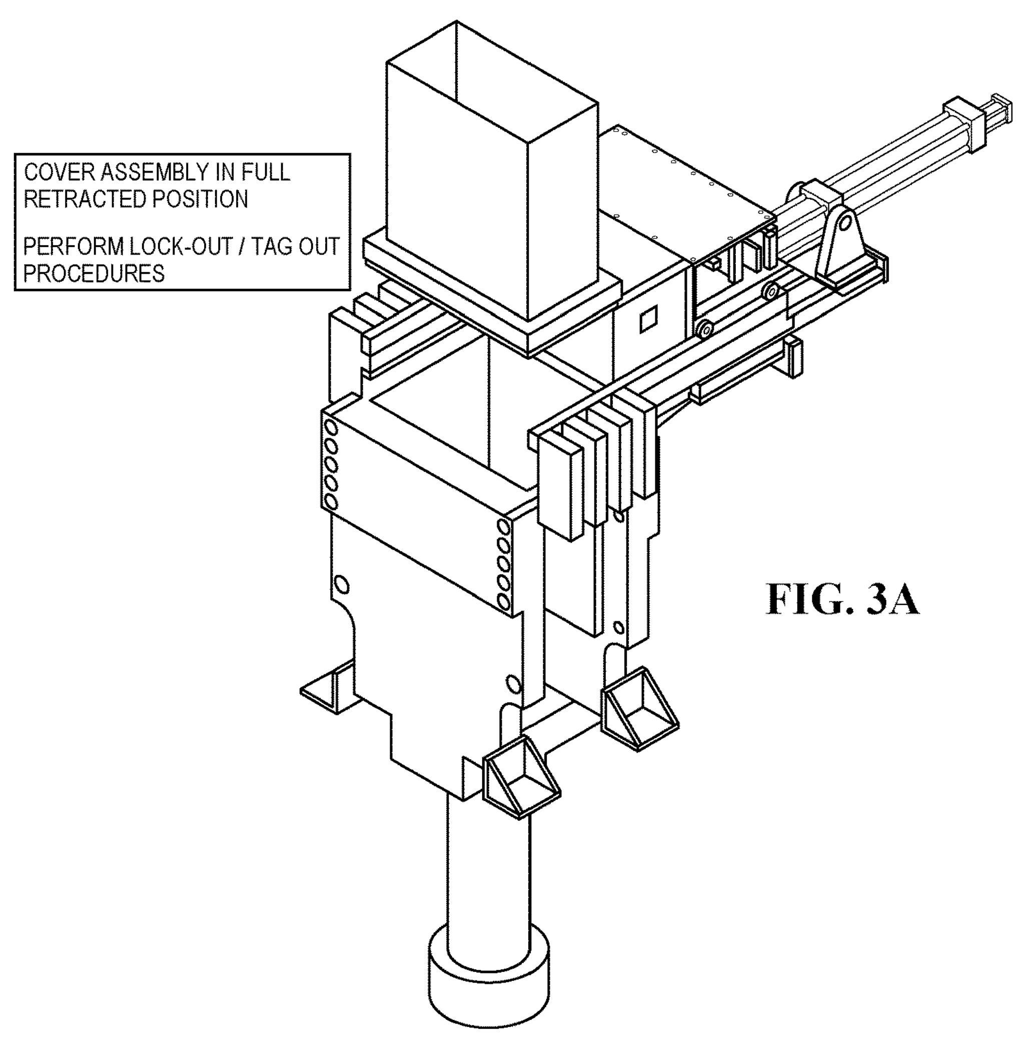
FIGS. 3A-3M illustrate an exemplary guide that an operator may interact with via a wearable mixed reality device.
Figure 3B:
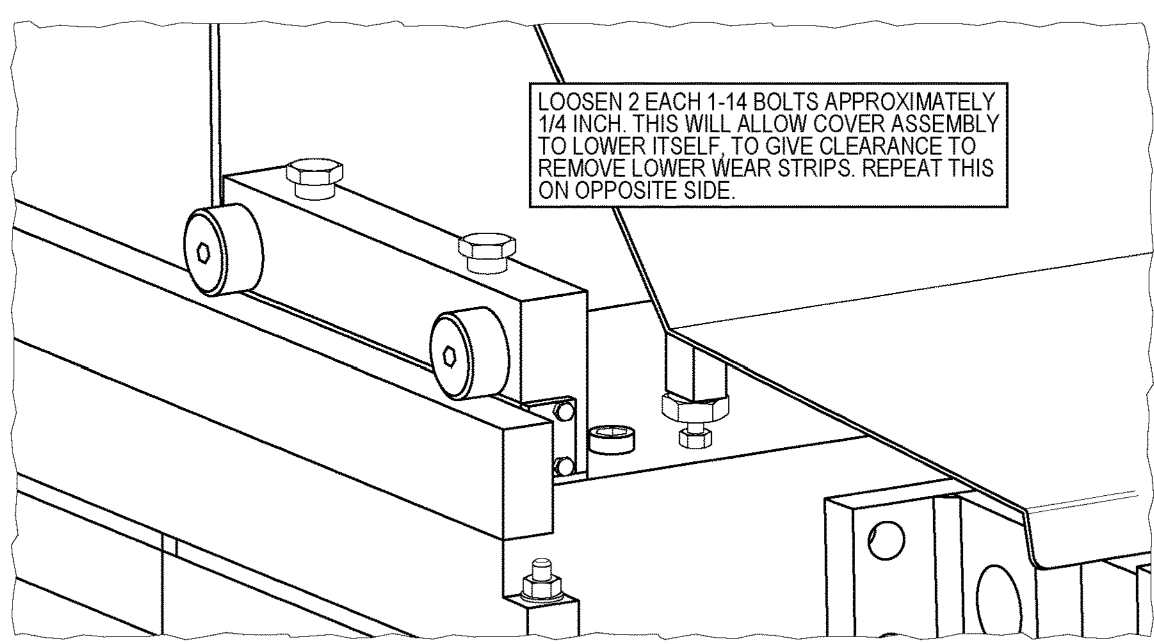
Figure 3C:
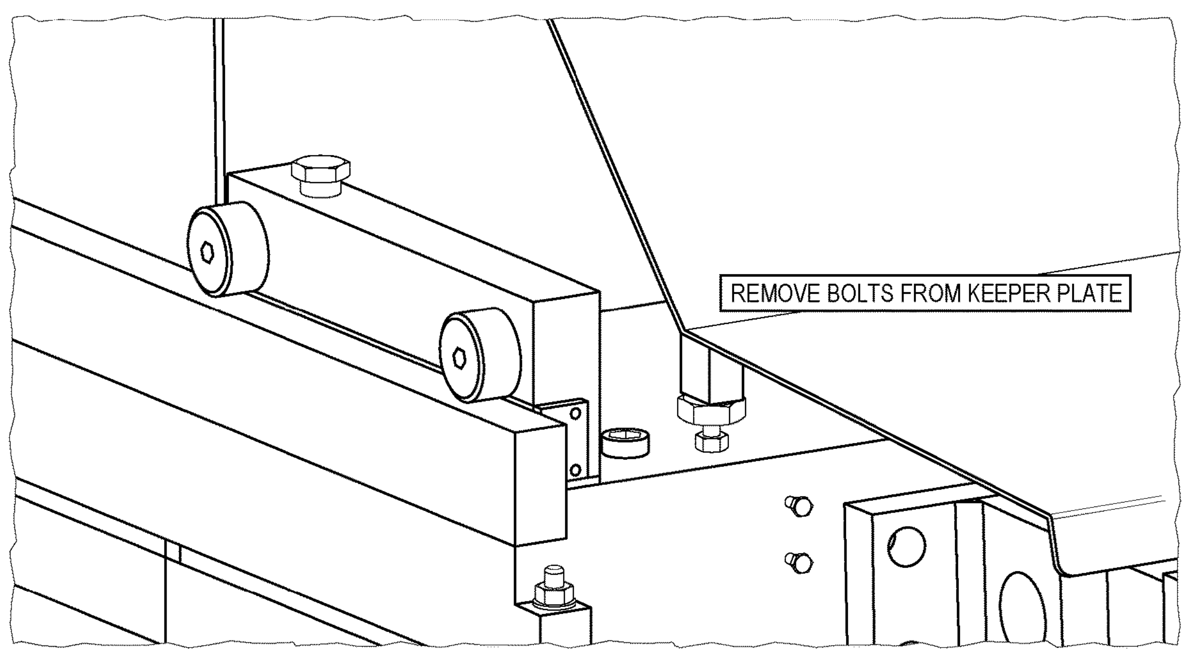
Figure 3D:
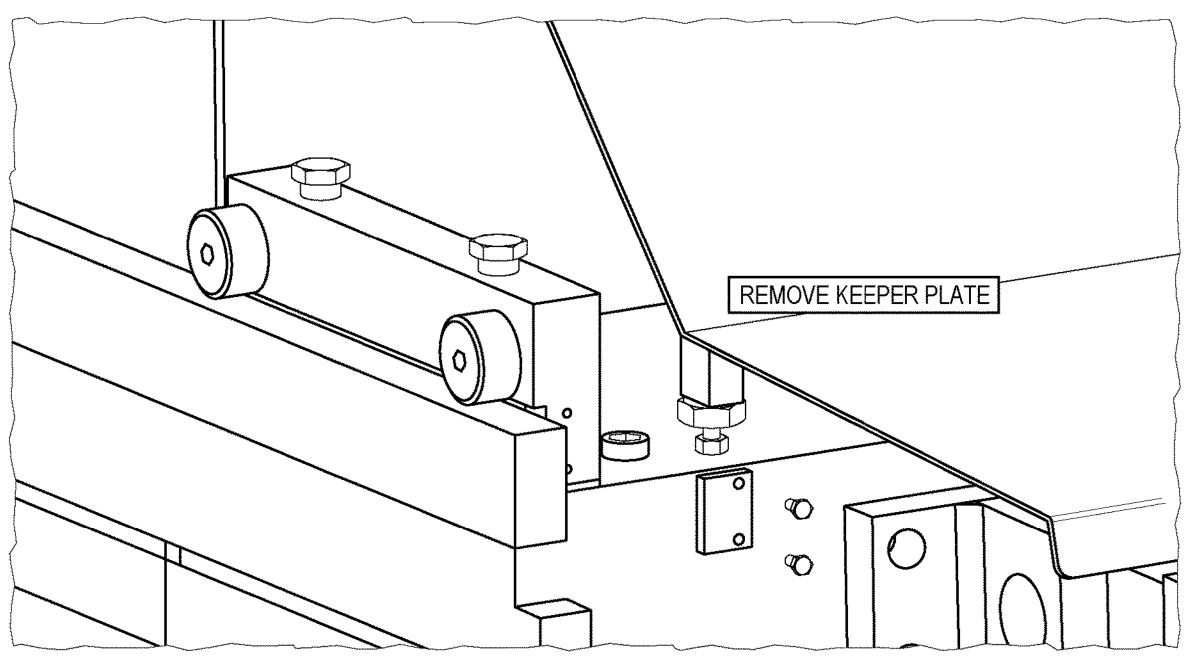
Figure 3E:
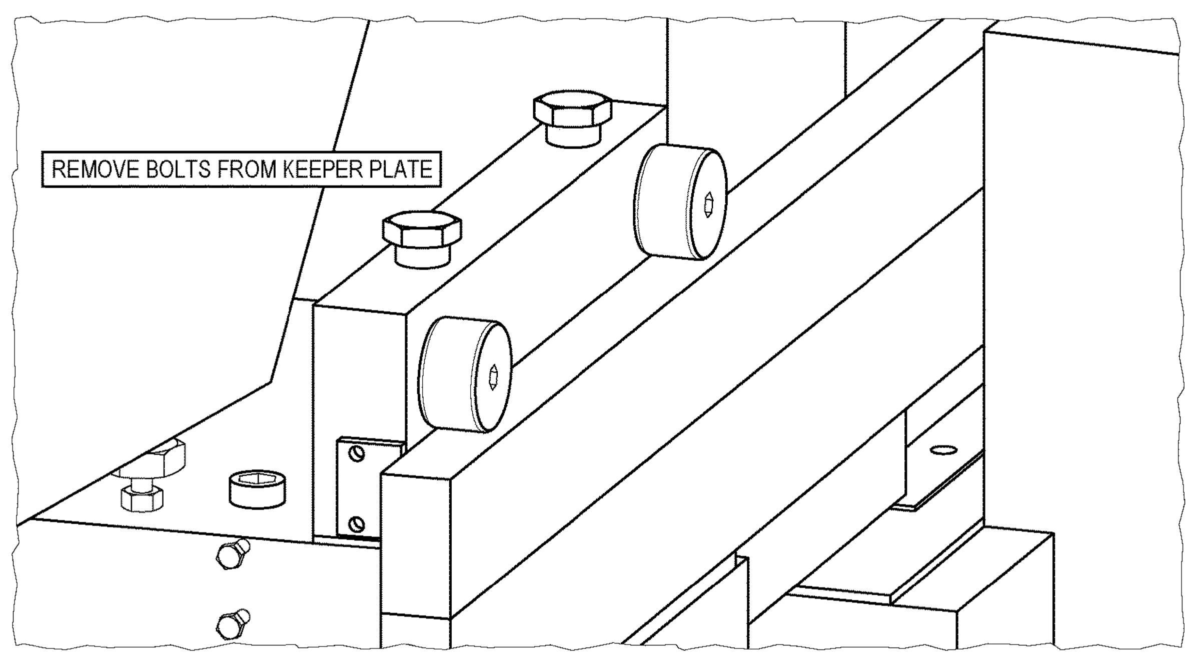
Figure 3F:
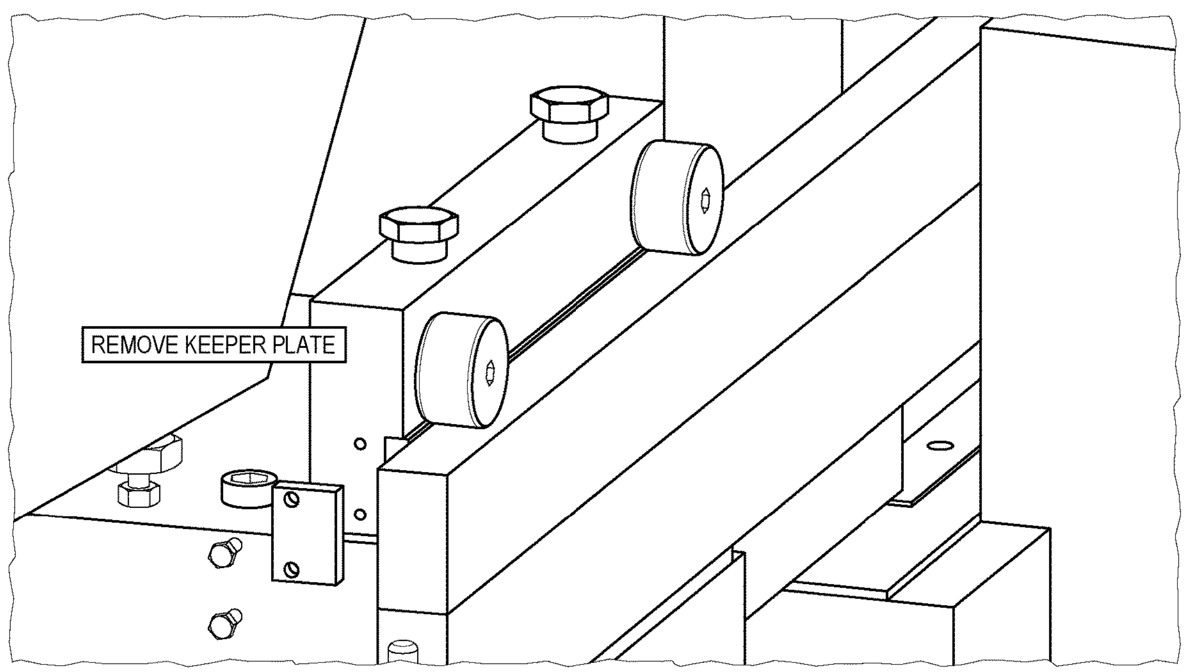
Figures 3G, 3H:
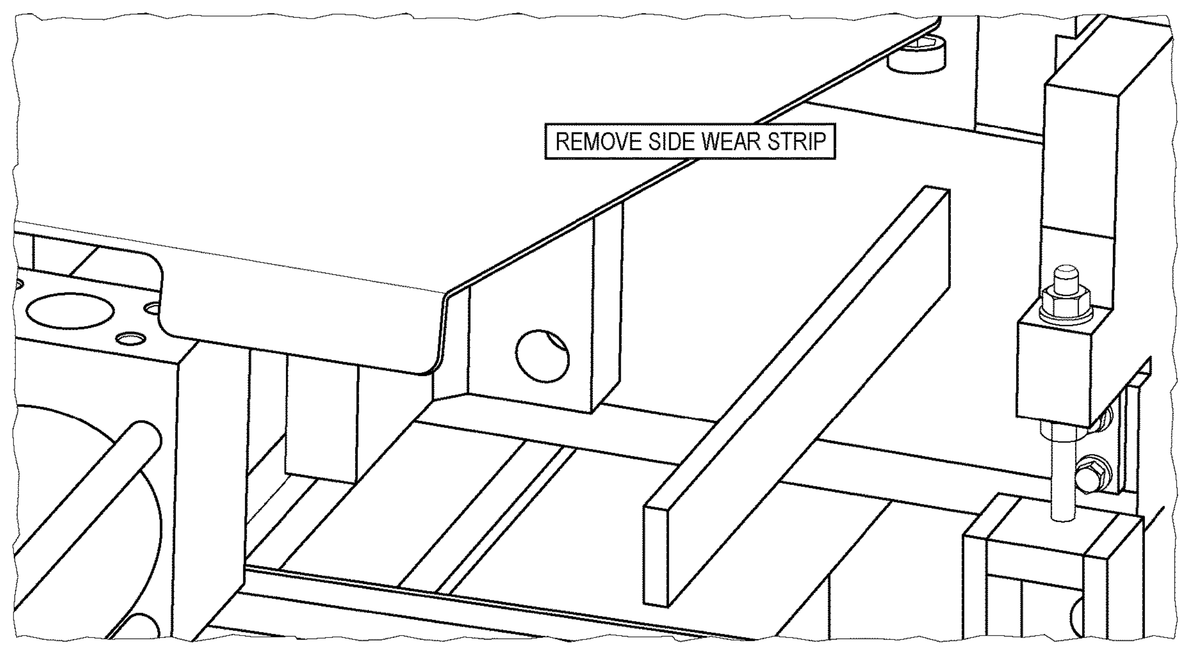
Figure 3I:
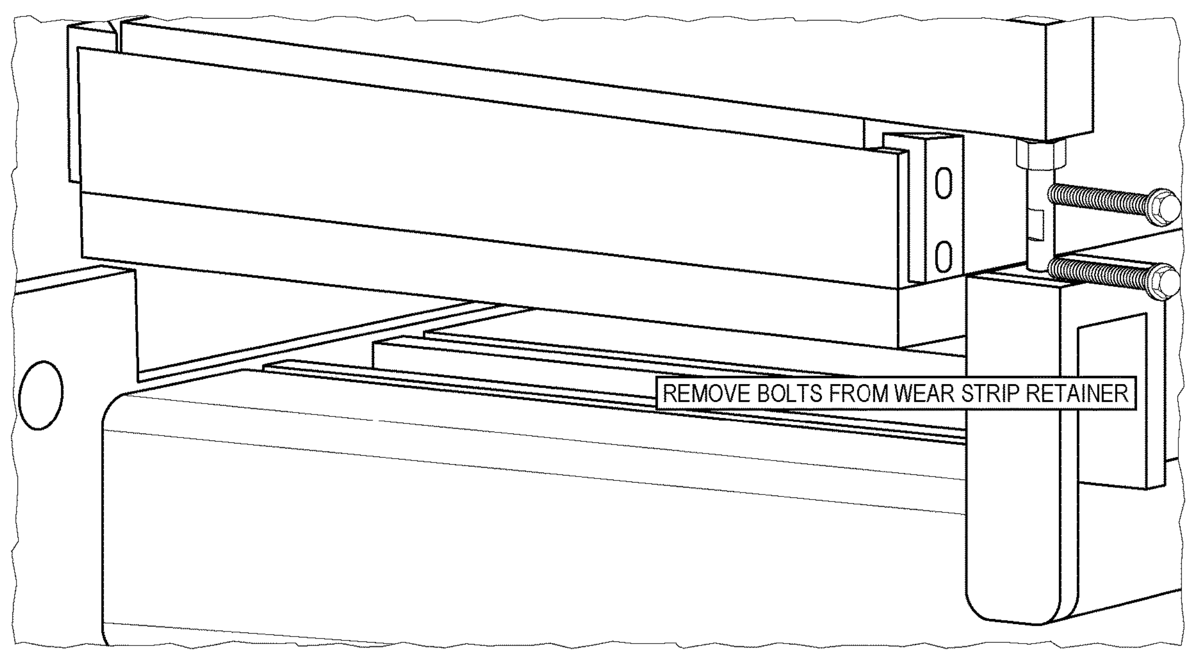
Figure 3J:
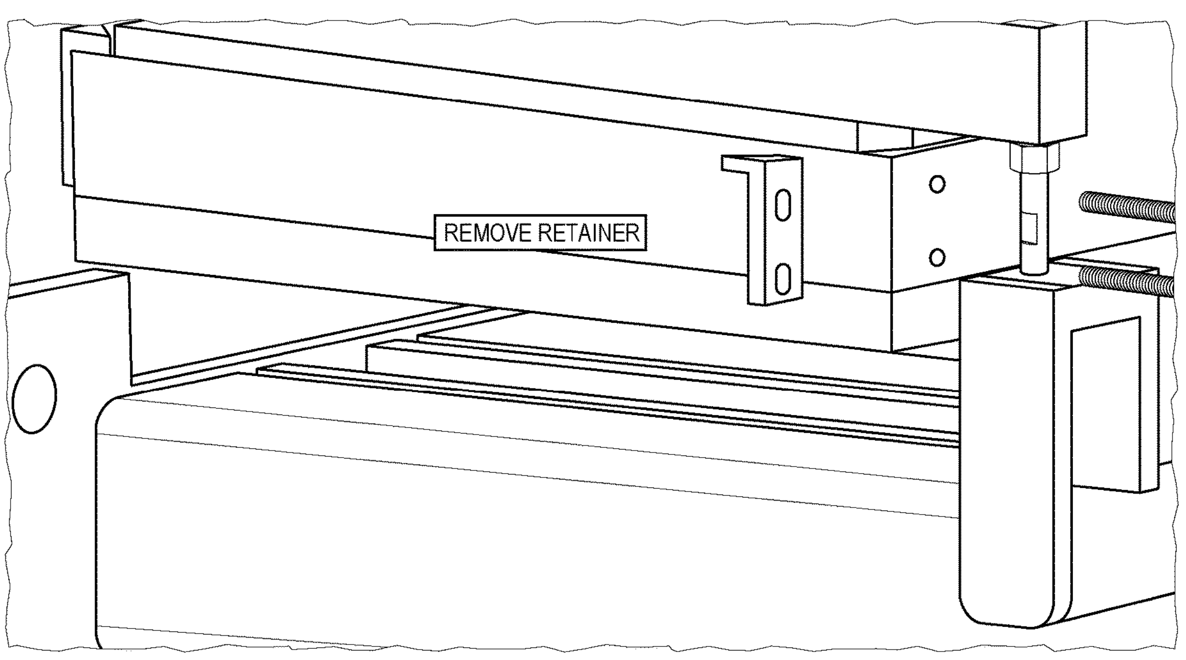
Figure 3K:
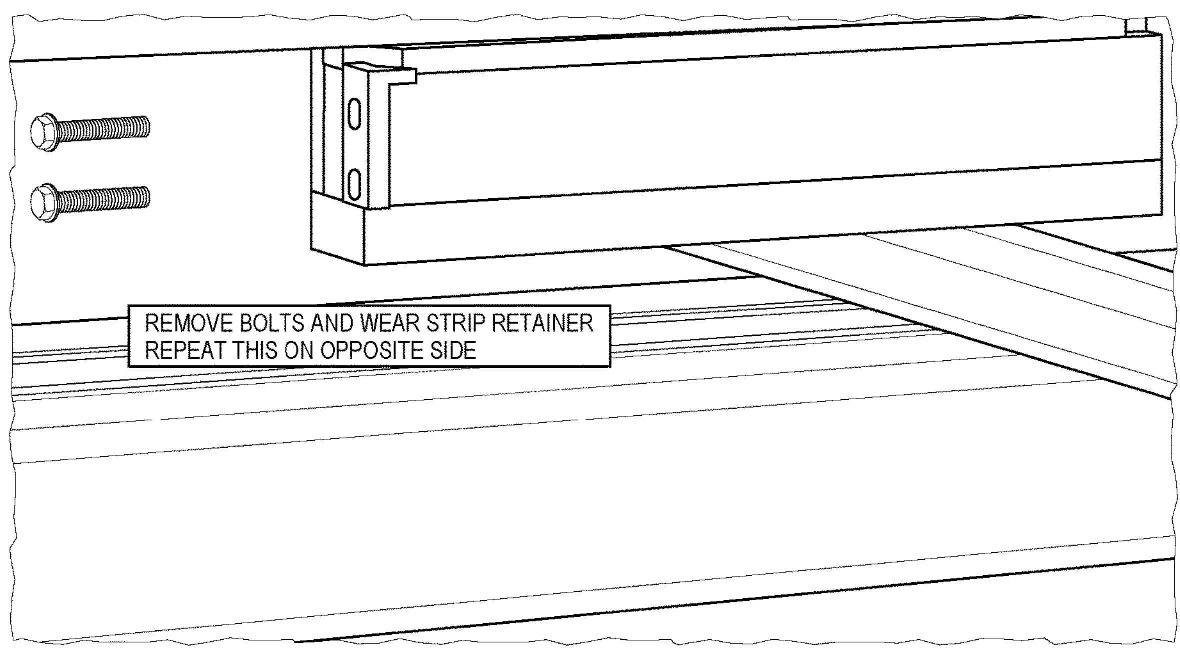
Figure 3L:
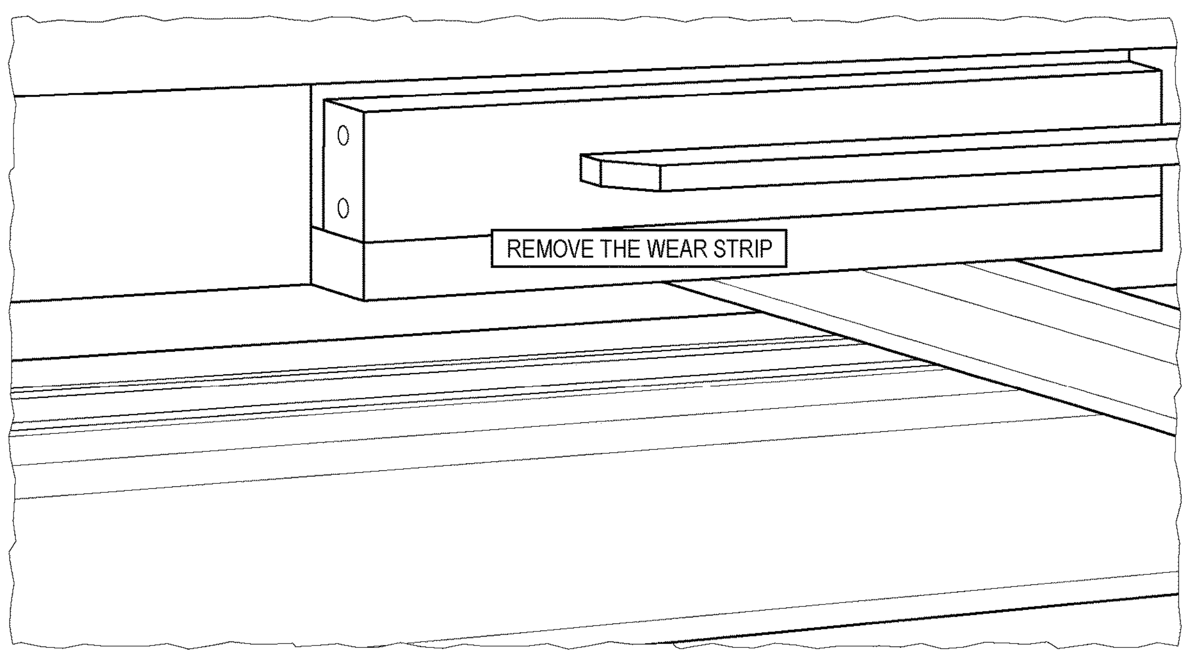
Figure 3M:
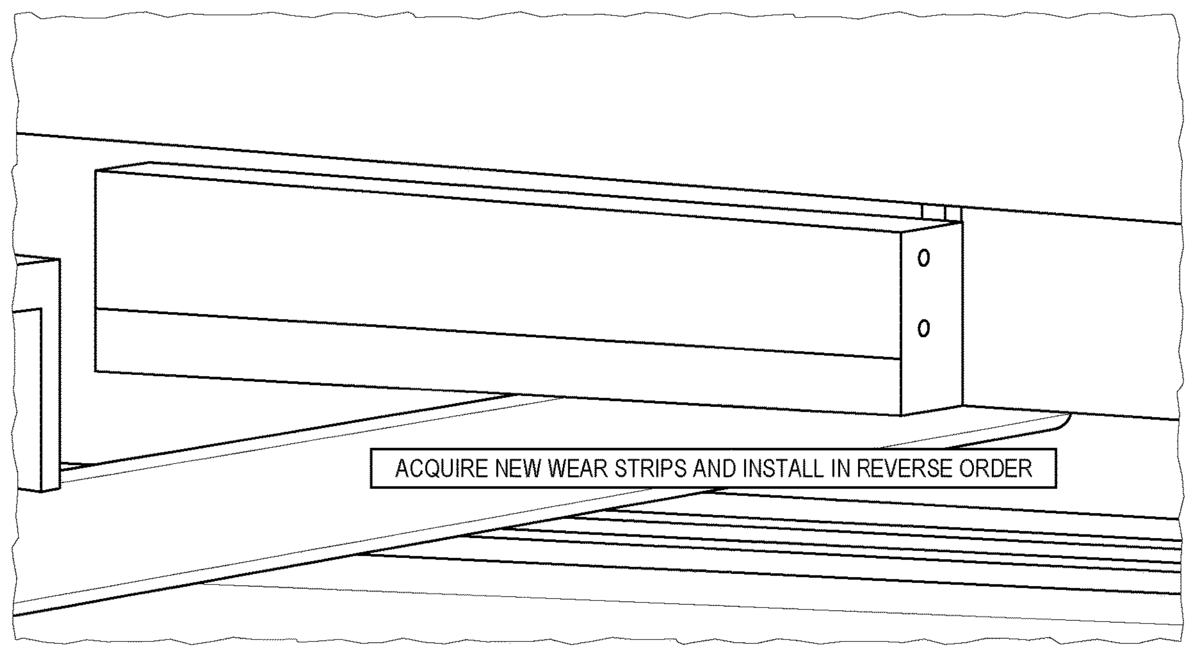
Figure 4A:
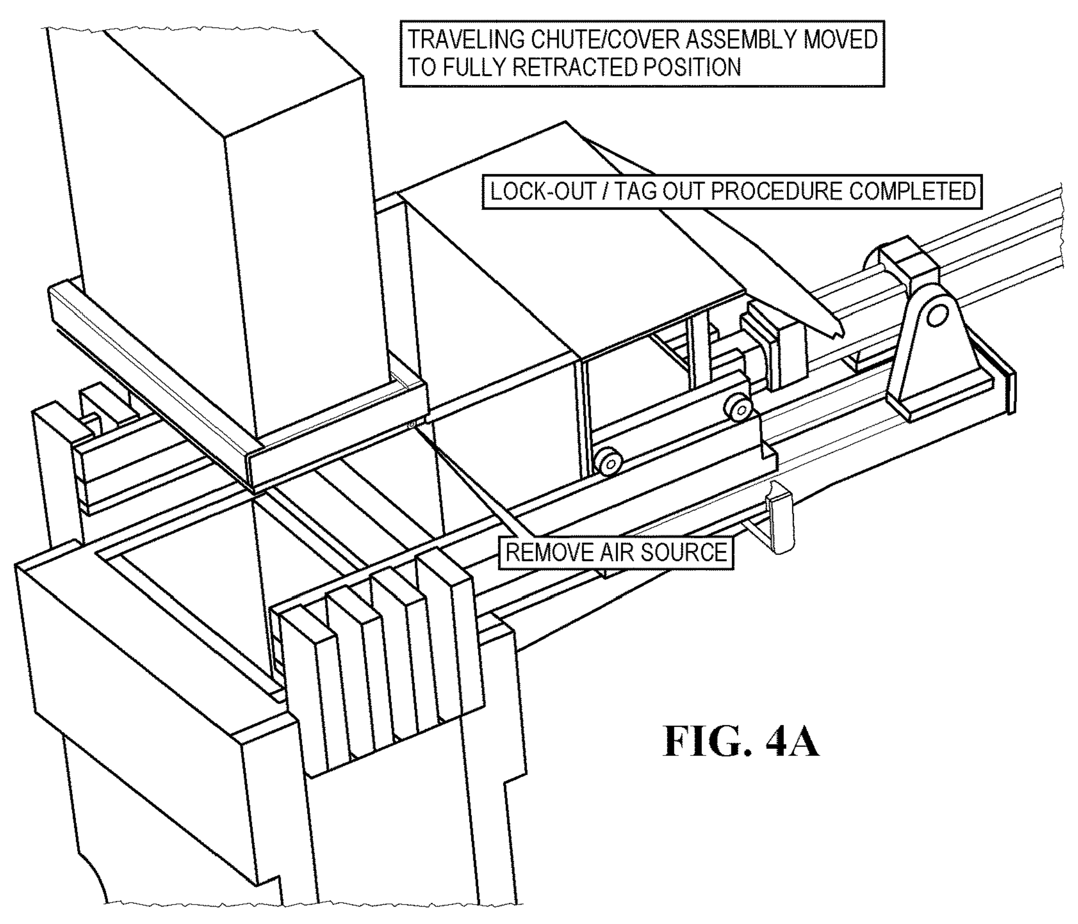
FIGS. 4A-4L illustrate another exemplary guide that an operator may interact with via a wearable mixed reality device.
Figure 4B:
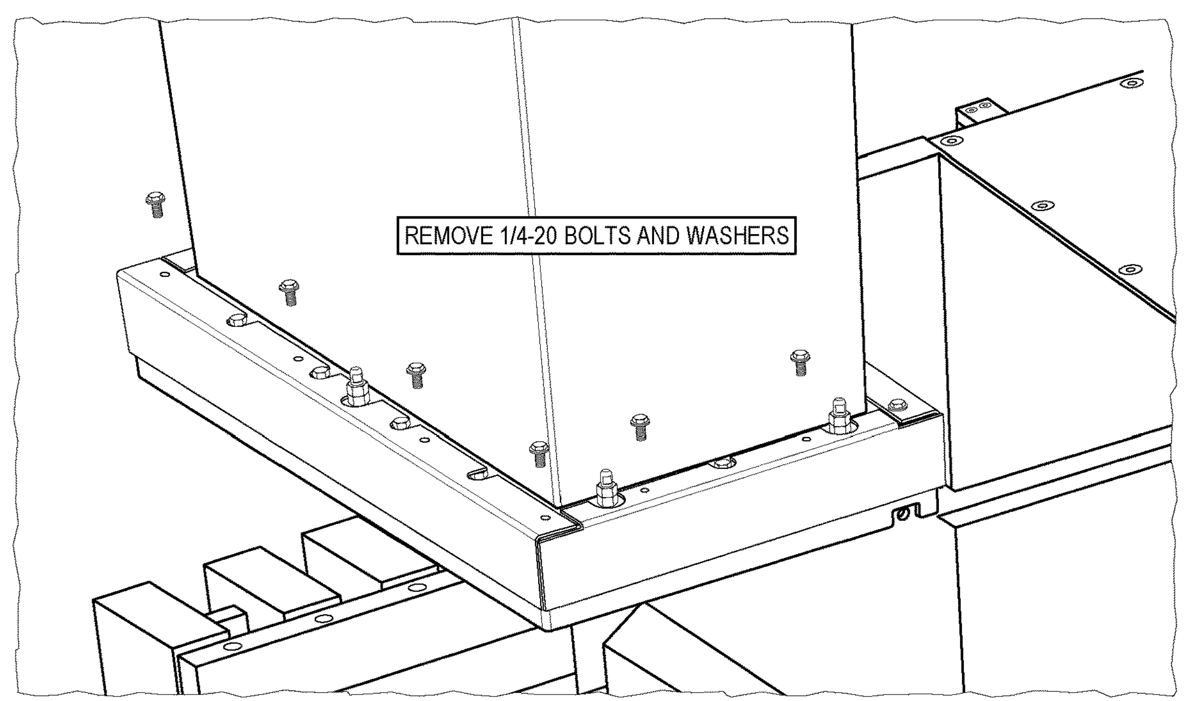
Figure 4C:
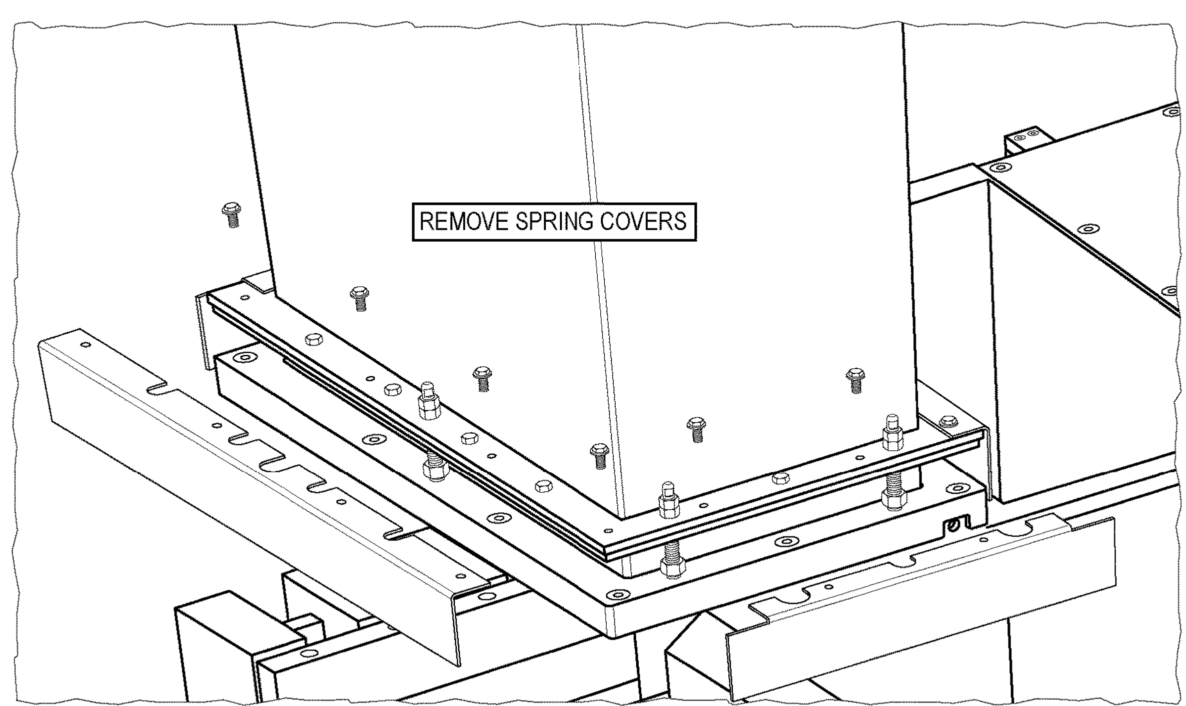
Figure 4D:
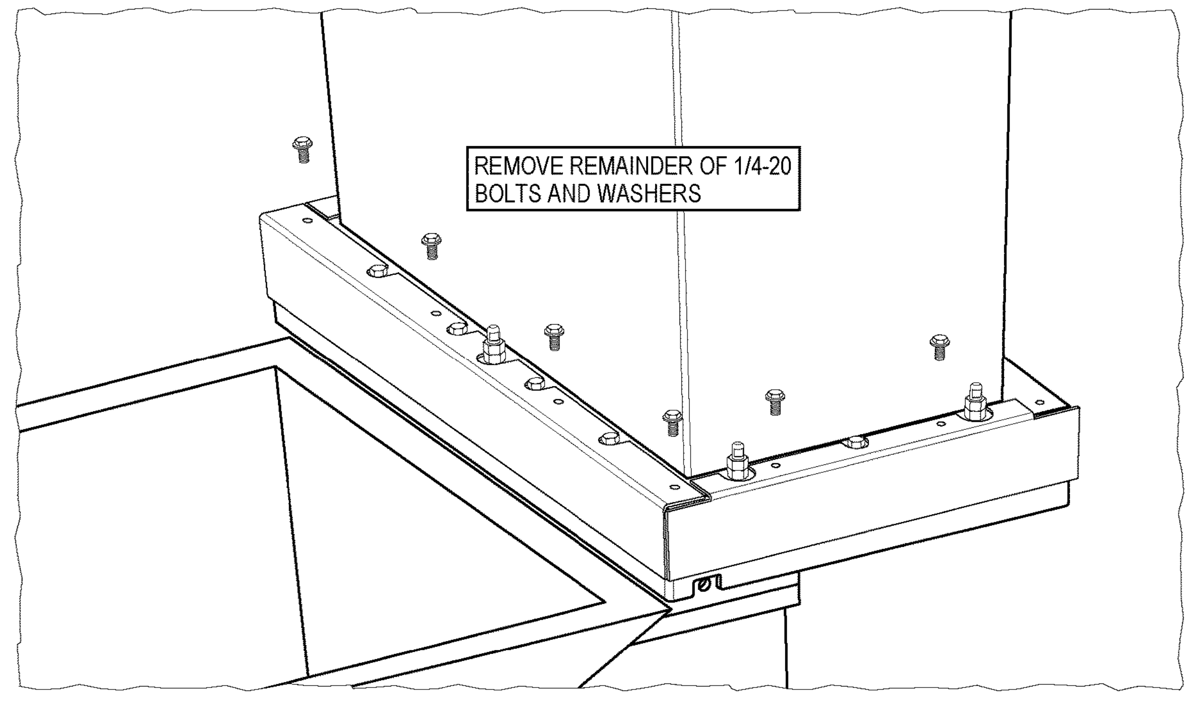
Figure 4E:
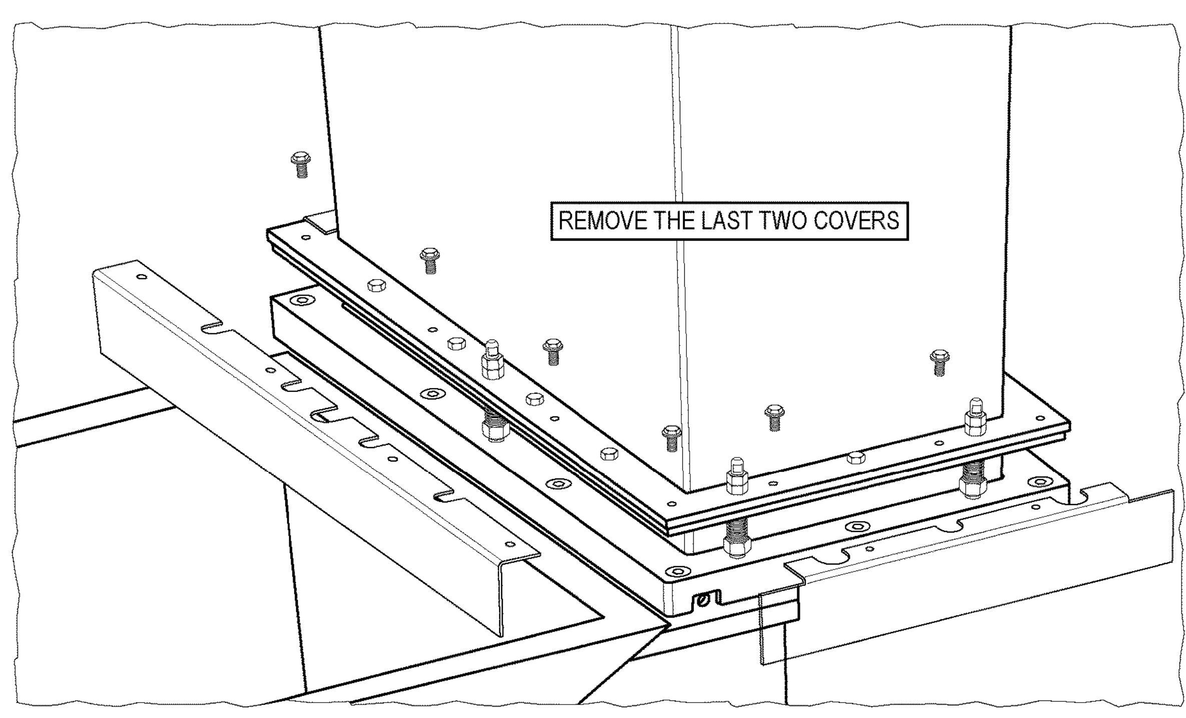
Figure 4F:
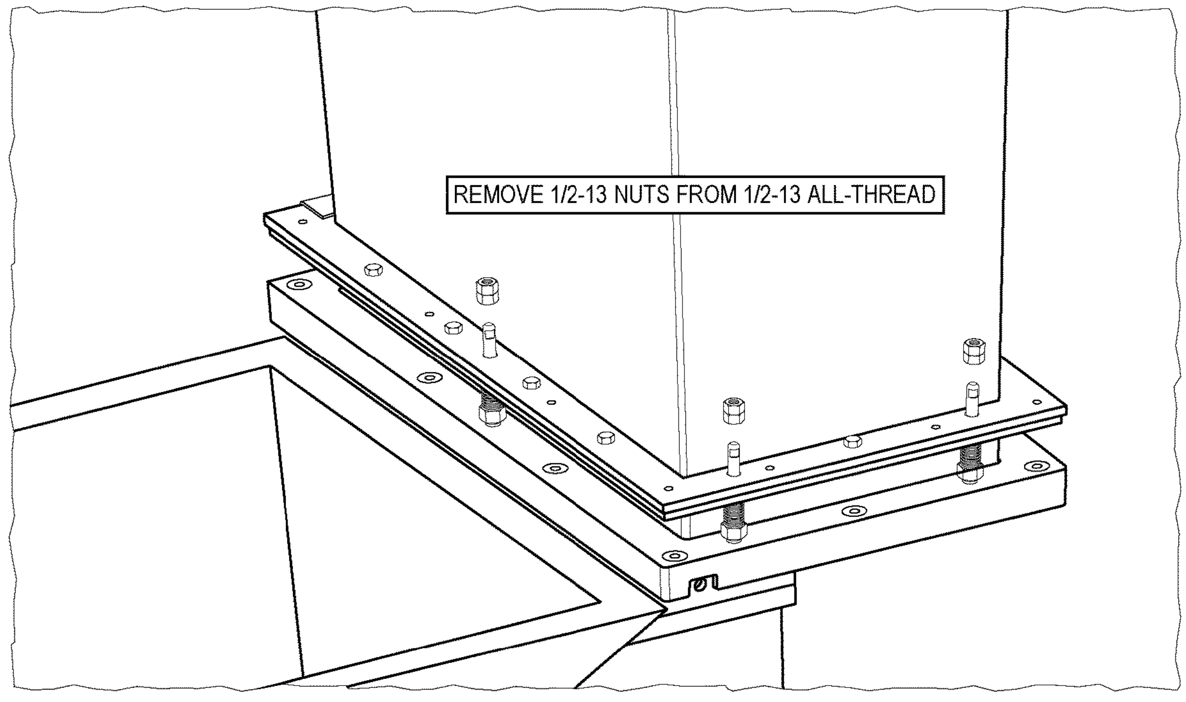
Figure 4G:
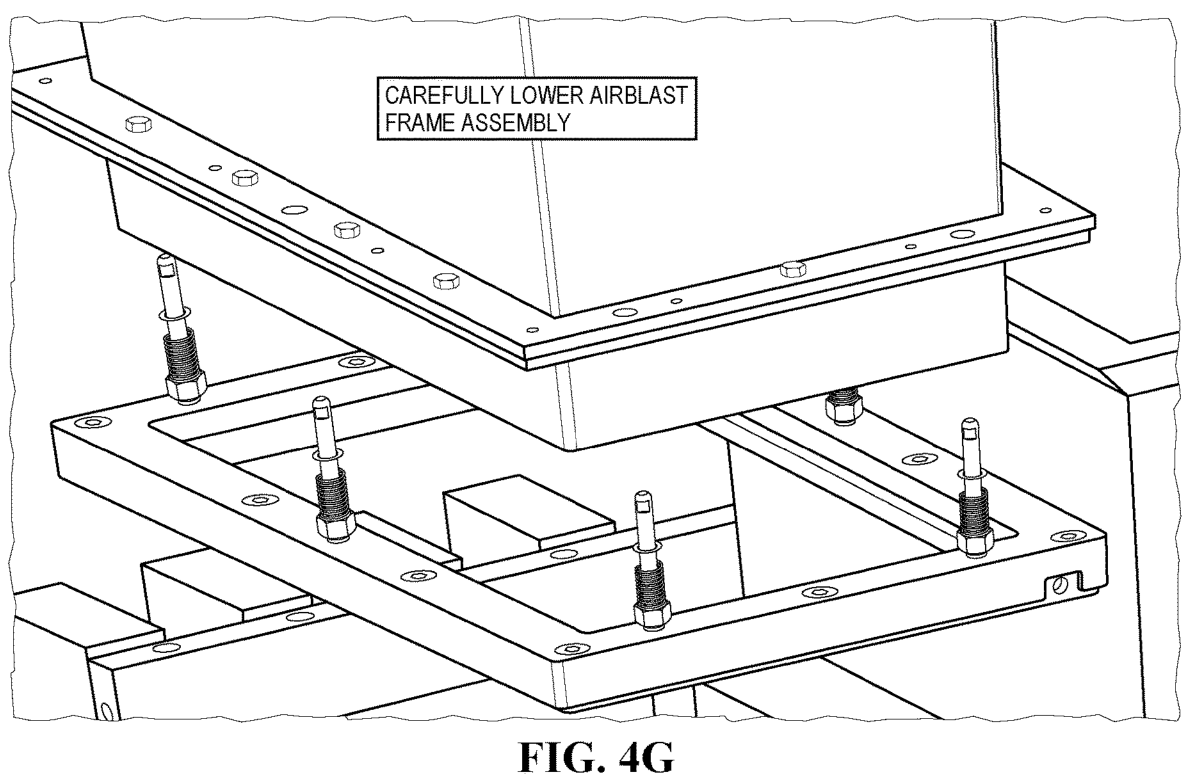
Figure 4H:
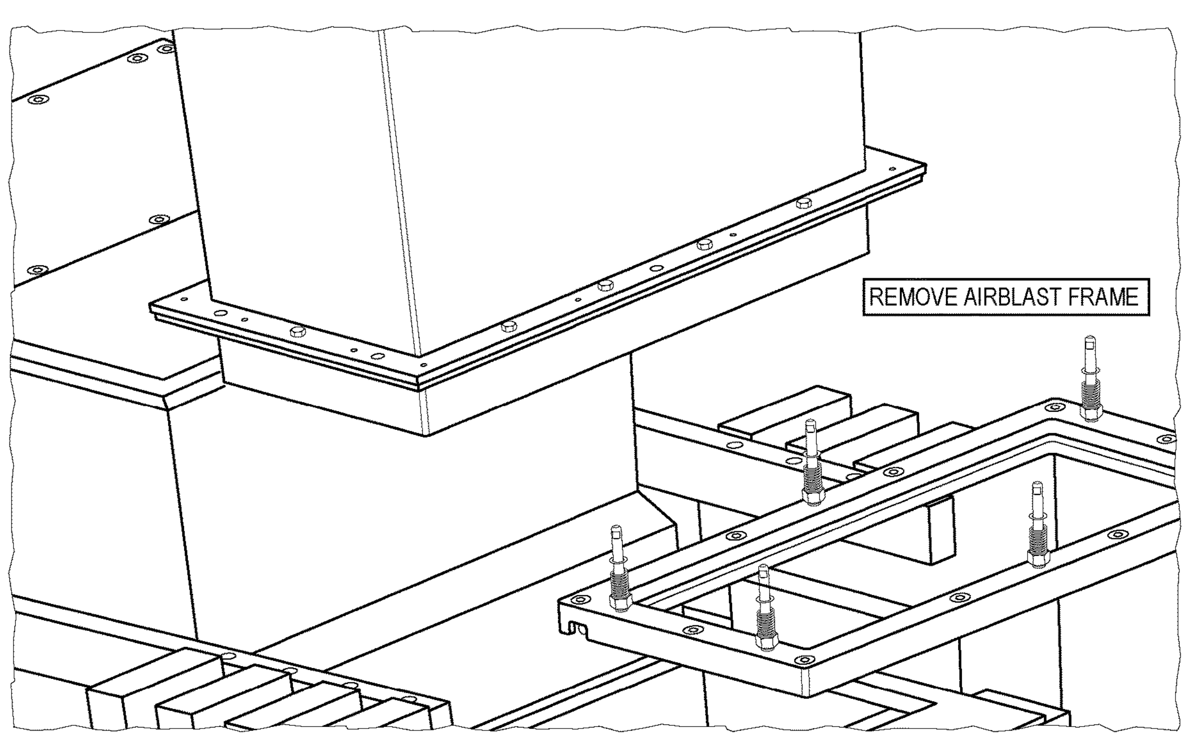
Figure 4I:
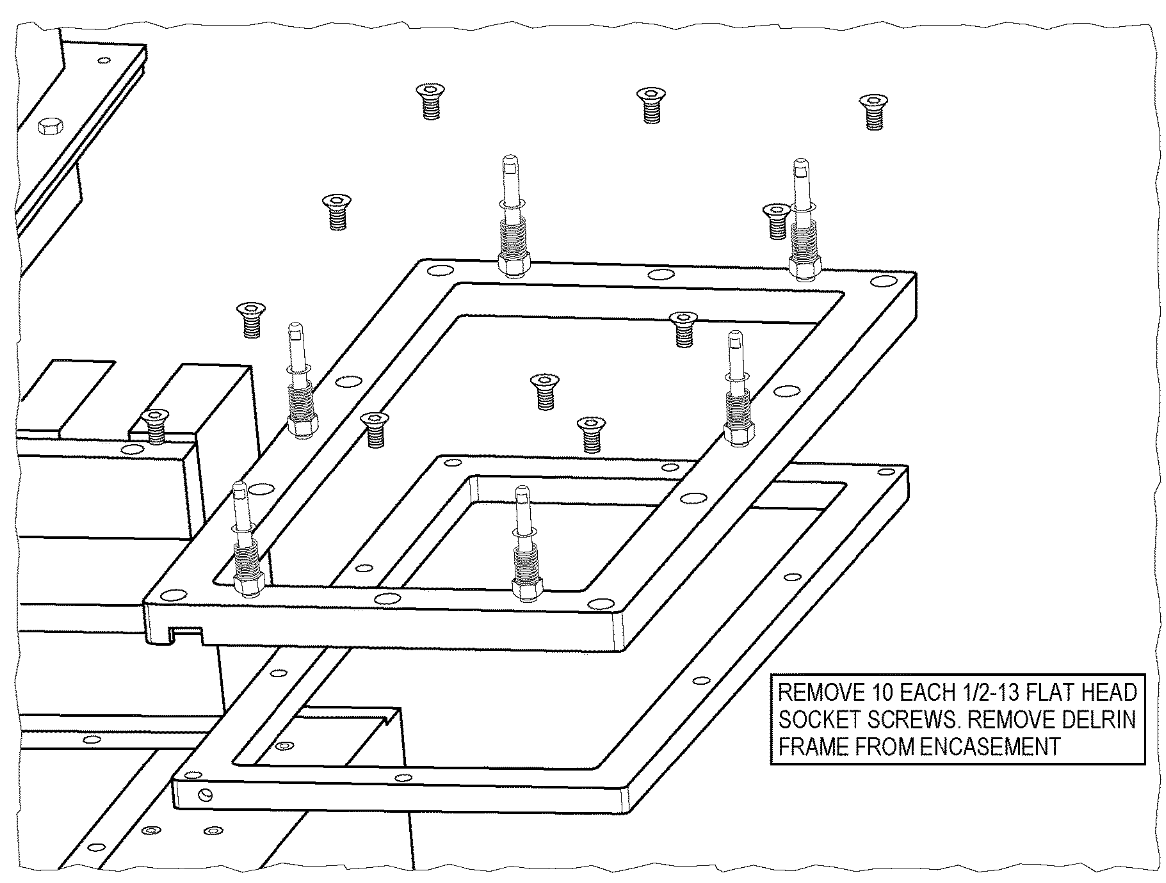
Figure 4J:
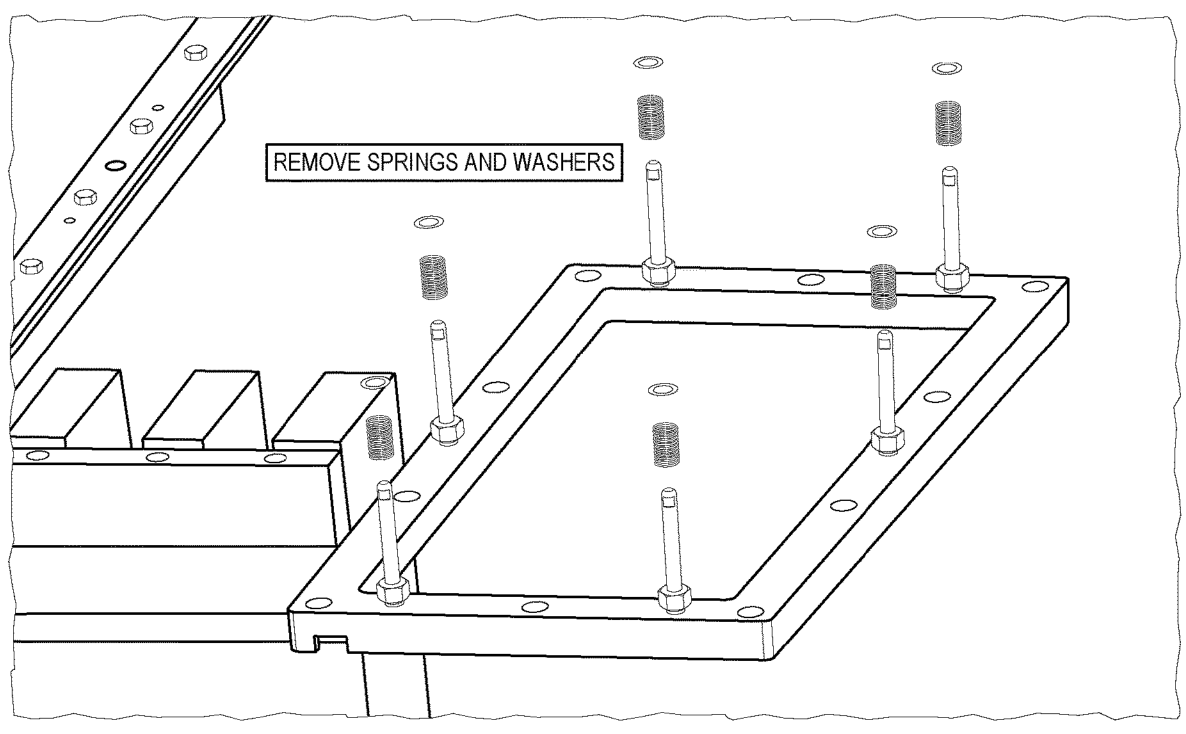
Figure 4K:
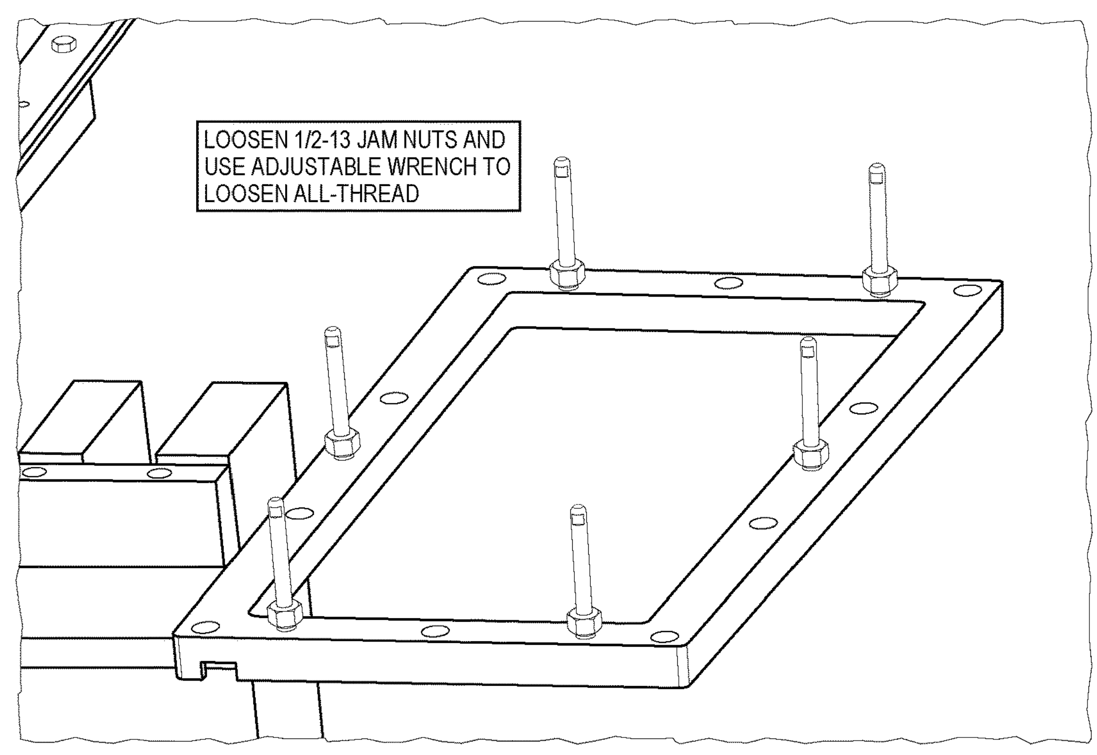
Figure 4L:
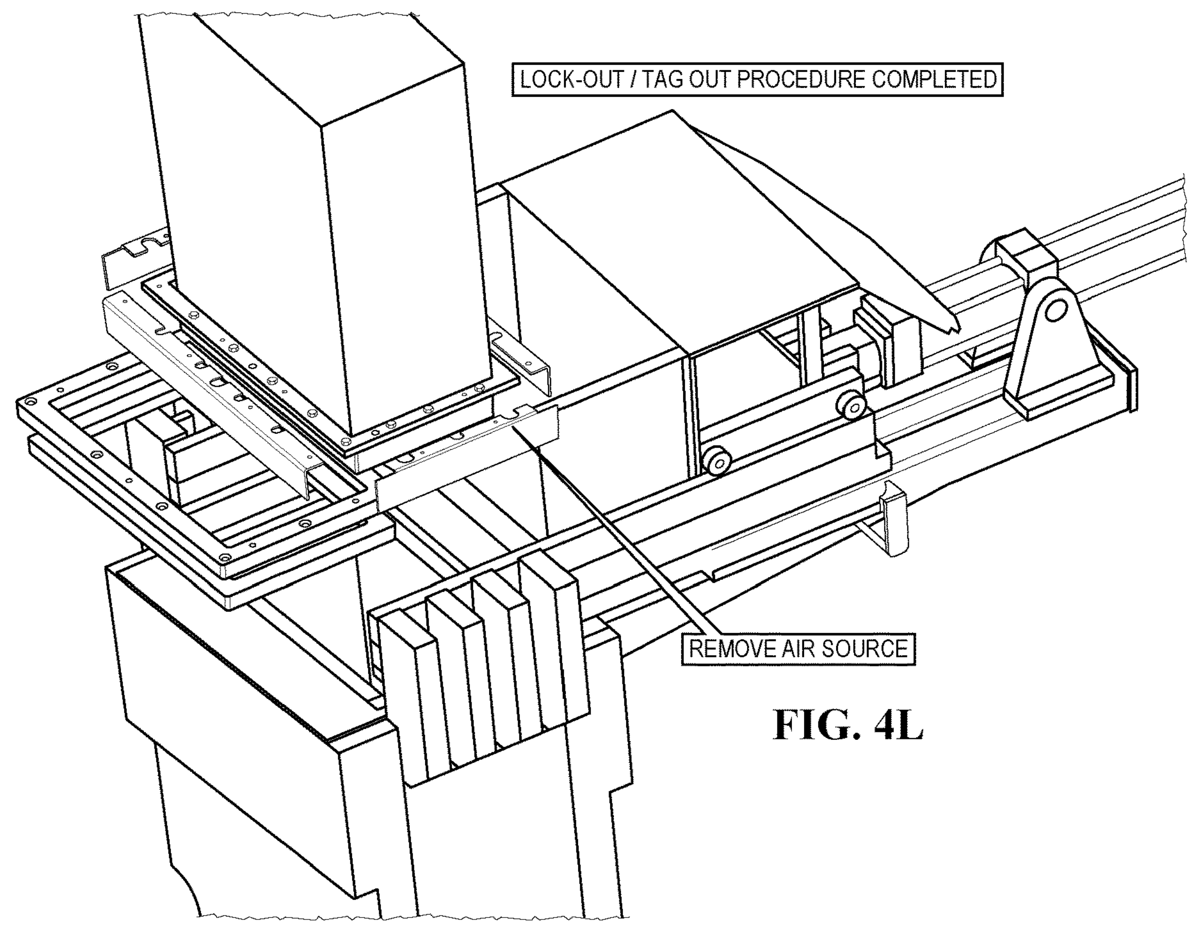

One example of use of wearable device 100 is illustrated in FIG. 2. In the example illustrated in FIG. 2, an operator is wearing a mixed-reality (MR) device. Through use of MR device, the operator may be provided with step-by-step instructions (including images or videos) and a 3-dimensional hologram, both of which are superimposed on a real-world environment. As shown, for example, the operator may be presented with, via wearable device 100, a virtual guide including instructions for maintaining or repairing one or more components of a rubber finishing line, such as a rubber baler in the physical environment. Further, as shown, the operator may be presented with a hologram of a component of the rubber baler showing additional detail. The operator may interact with the virtual guide and hologram in various ways including, but not limited to, gestures, voice commands, gaze, and the like.

In addition, wearable device 100 may be used for machine reliability. For instance, wearable device 100 may facilitate recording each step performed by the operator, such that the recording may be reviewed in case of future failures. Further, wearable device may facilitate training and collaborating with remote users in real-time to, for example, solve complex problems, update instructions, and increase productivity.

FIGS. 3A-3H illustrate an exemplary guide for manipulating components, such as installing new wear strips on a baler machine. The exemplary guide may be superimposed on a real world environment (e.g., baler machine) via a mixed-reality device, such as wearable device 100 of FIG. 1. The guide may be a video or series of images and text and include virtual buttons (such as "play", "pause," "next step," "go back," "restart," and the like). As shown, the guide may visually present to an operator a representation or hologram of a baler machine. The guide may include step-by-step instructions with visual representations that a user may interact with for installing new wear strips. As illustrated in FIGS. 3A-3H, such steps may include loosening bolts for accessing cover assembly, removing a keeper plate from both sides of the baler machine, removing side wear strips, removing bolts from wear strip retainers, removing wear strips, and installing new wear strips in reverse order.

FIGS. 4A-4L illustrate another exemplary guide that may be superimposed on a real world environment via a mixed-reality device, such as wearable device 100 of FIG. 1. As shown, the guide may visually present to an operator a representation or hologram of a baler machine such that a user may perform a lockout/tagout procedure. The guide may include step-by-step instructions with visual representations that a user may interact with for performing the procedure. As illustrated in FIGS. 4A-4L, such steps may include manipulating components, such as removing bolts and washers, removing spring covers, removing nuts from thread, lowering an airblast assembly, removing an airblast frame and related hardware, and removing an air source.

Figure 5:
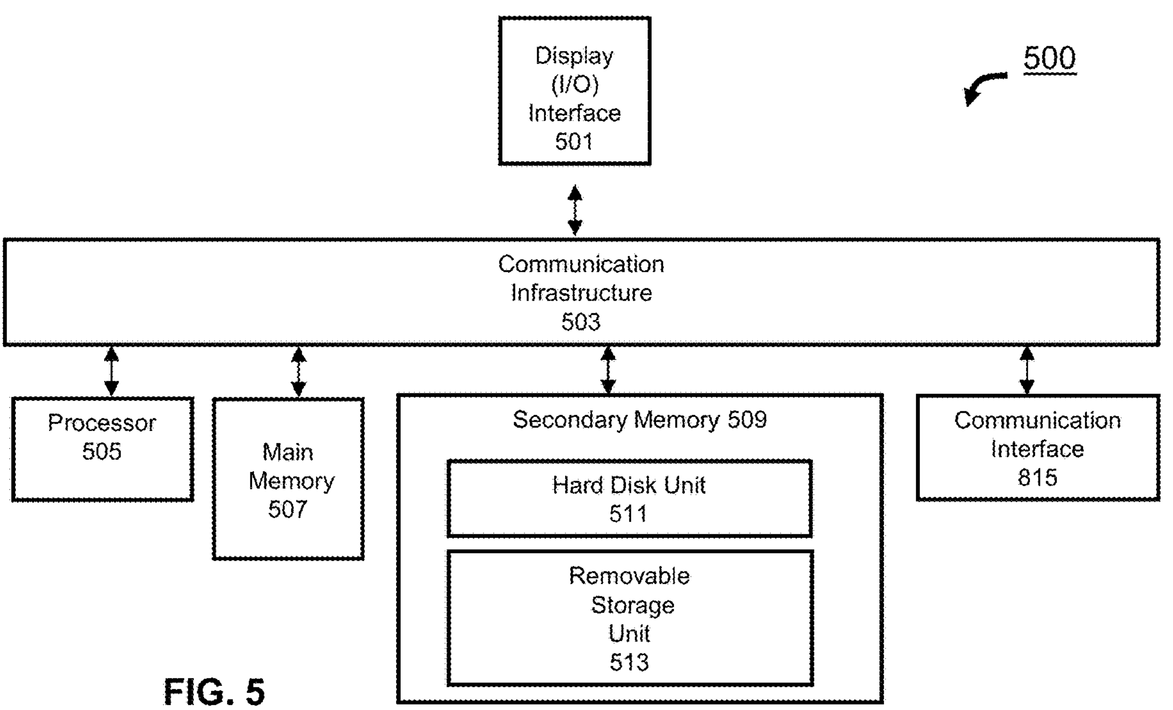
FIG. 5 illustrates an exemplary computing system that may be used for implementation of all or a portion of the system.

FIG. 5 illustrates a diagram of a system of which may be an embodiment of the present disclosure. System 500 includes an input/output interface 502 connected to communication infrastructure 504—such as a bus—which forwards data such as audio, graphics, text, and information, from the communication infrastructure 504 or from a frame buffer (not shown) to other components of the system 500. The input/output interface 502 may be a virtual reality, augmented reality or mixed reality device. Other examples of contemplated input/output interface may include a touchscreen, a display device, a keyboard, touch screen, joystick, trackball, mouse, monitor, speaker, printer, virtual and/or augmented reality unit, web camera, any other computer peripheral device, or any combination thereof, capable of inputting, receiving, and/or viewing data.

System 500 includes one or more processors 506, which may be a special purpose or a general-purpose digital signal processor configured to process certain information. System 500 also includes a main memory 508, for example random access memory (RAM), read-only memory (ROM), mass storage device, or combinations of each. System 500 may also include a secondary memory 510 such as a hard disk unit 512, a removable storage unit 514, or combinations of each. System 500 may also include a communication interface 516, for example, a modem, a network interface (such as an Ethernet card or Ethernet cable), a communication port, a PCMCIA slot and card, wired or wireless systems (such as Wi-Fi, Bluetooth, Infrared), local area networks, wide area networks, intranets, etc.

It is contemplated that the main memory 508, secondary memory 510, communication interface 516, or combinations of each, function as a computer usable storage medium, otherwise referred to as a computer readable storage medium, to store and/or access computer software including computer instructions. For example, computer programs or other instructions may be loaded into the system 500 such as through a removable storage device, for example, a floppy disk, ZIP disks, magnetic tape, portable flash drive, optical disk such as a CD or DVD or Blu-ray, Micro-Electro-Mechanical Systems (MEMS), nanotechnological apparatus. Specifically, computer software including computer instructions may be transferred from the removable storage unit 514 or hard disc unit 512 to the secondary memory 510 or through the communication infrastructure 503 to the main memory 508 of the system 500.

Communication interface 516 allows software, instructions and data to be transferred between the system 500 and external devices or external networks. Software, instructions, and/or data transferred by the communication interface 516 are typically in the form of signals that may be electronic, electromagnetic, optical or other signals capable of being sent and received by the communication interface 516. Signals may be sent and received using wire or cable, fiber optics, a phone line, a cellular phone link, a Radio Frequency (RF) link, wireless link, or other communication channels.

Computer programs, when executed, enable system 500, particularly the processor 506, to implement the disclosed methods according to computer software including instructions.

System 500 described may perform any one of, or any combination of, the steps of any of the methods according to the invention. It is also contemplated that the methods according to the invention may be performed automatically.

The system 500 of FIG. 10 is provided only for purposes of illustration, such that the invention is not limited to this specific embodiment. It is appreciated that a person skilled in the relevant art knows how to program and implement the invention using any computer system.

System 500 may be a handheld device and include any small-sized computer device including, for example, a personal digital assistant (PDA), hand-held computing device, cellular telephone, or a laptop or netbook computer, mobile system, tablet, or similar hand held computer device, such as an iPad, iPad Touch or iPhone.

Figure 6:
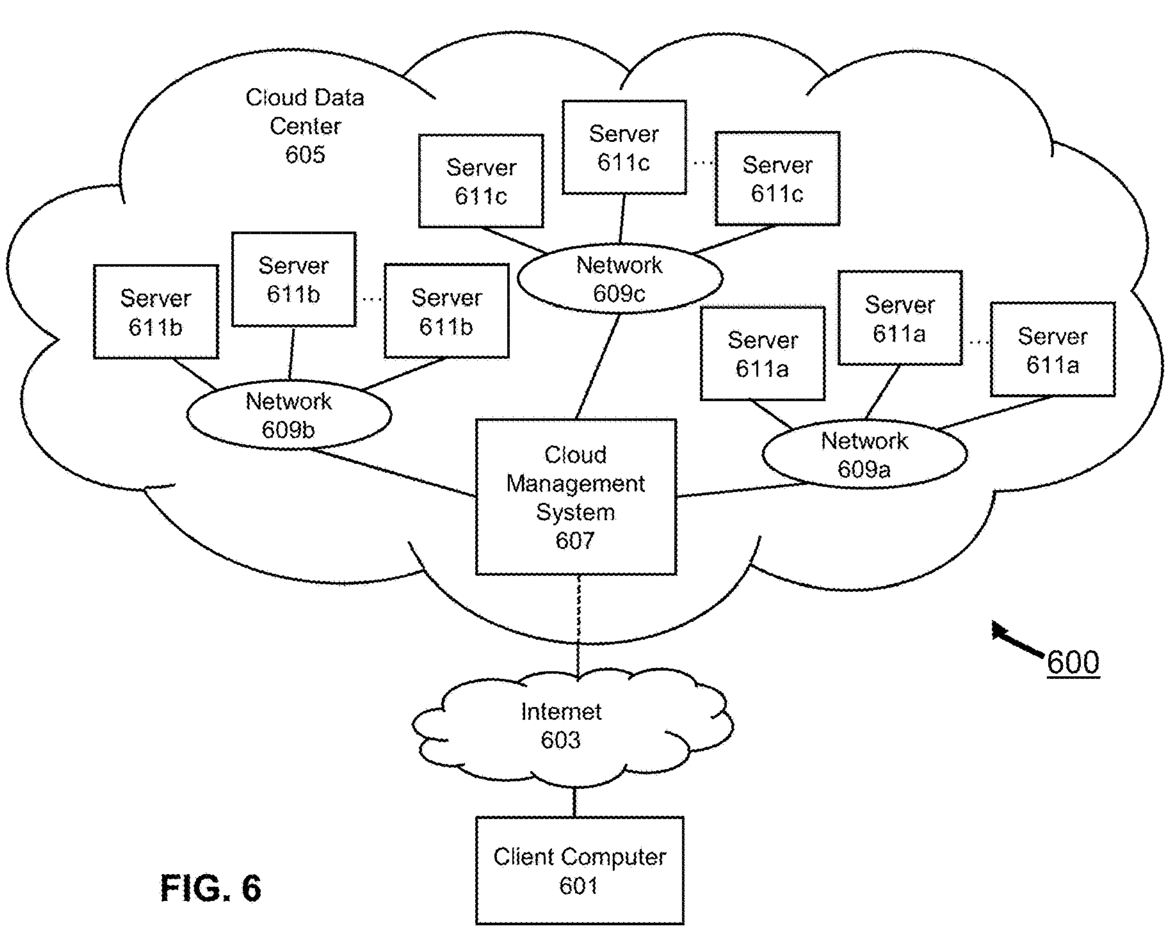
FIG. 6 is an exemplary cloud computing system that may be used for implementation of all or a portion of the system.

FIG. 6 illustrates an exemplary cloud computing system 600 that may be an embodiment of the present invention. The cloud computing system 600 includes a plurality of interconnected computing environments. The cloud computing system 600 utilizes the resources from various networks as a collective virtual computer, where the services and applications can run independently from a particular computer or server configuration making hardware less important.

Specifically, the cloud computing system 600 includes at least one client computer system 602, such as system 500. The client computer 602 may be any device through the use of which a distributed computing environment may be accessed to perform the methods disclosed herein, for example, a traditional computer, portable computer, mobile phone, personal digital assistant, tablet to name a few. The client computer 602 includes memory such as random access memory (RAM), read-only memory (ROM), mass storage device, or any combination thereof. The memory functions as a computer usable storage medium, otherwise referred to as a computer readable storage medium, to store and/or access computer software and/or instructions.

The client computer 602 also may include a communications interface, for example, a modem, a network interface (such as an Ethernet card), a communications port, a PCM-CIA slot and card, wired or wireless systems, etc. The communications interface allows communication through transferred signals between the client computer 602 and external devices including networks such as the Internet 604 and cloud data center 606. Communication may be implemented using wireless or wired capability such as cable, fiber optics, a phone line, a cellular phone link, radio waves or other communication channels.

The client computer 602 establishes communication with the Internet 604—specifically to one or more servers—to, in turn, establish communication with one or more cloud data centers 606. A cloud data center 606 includes one or more networks 610*a*, 610*b*, 610*c* managed through a cloud management system 608. Each network 610*a*, 610*b*, 610*c* includes resource servers 612*a*, 612*b*, 612*c*, respectively. Servers 612*a*, 612*b*, 612*c* permit access to a collection of computing resources and components that can be invoked to instantiate a virtual machine, process, or other resource for a limited or defined duration. For example, one group of resource servers can host and serve an operating system or components thereof to deliver and instantiate a virtual machine. Another group of resource servers can accept requests to host computing cycles or processor time, to supply a defined level of processing power for a virtual machine. A further group of resource servers can host and serve applications to load on an instantiation of a virtual machine, such as an email client, a browser application, a messaging application, or other applications or software.

The cloud management system 608 can comprise a dedicated or centralized server and/or other software, hardware, and network tools to communicate with one or more networks 610*a*, 610*b*, 610*c*, such as the Internet or other public or private network, with all sets of resource servers 612*a*, 612*b*, 612*c*. The cloud management system 608 may be configured to query and identify the computing resources and components managed by the set of resource servers 612*a*, 612*b*, 612*c* needed and available for use in the cloud data center 606. Specifically, the cloud management system 608 may be configured to identify the hardware resources and components such as type and amount of processing power, type and amount of memory, type and amount of storage, type and amount of network bandwidth and the like, of the set of resource servers 612*a*, 612*b*, 612*c* needed and available for use in the cloud data center 606. Likewise, the cloud management system 608 can be configured to identify the software resources and components, such as type of Operating System (OS), application programs, and the like, of the set of resource servers 612*a*, 612*b*, 612*c* needed and available for use in the cloud data center 606.

The present invention is also directed to computer products, otherwise referred to as computer program products, to provide software to the cloud computing system 600. Computer products store software on any computer useable medium, known now or in the future. Such software, when executed, may implement the methods according to certain embodiments of the invention. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, Micro-Electro-Mechanical Systems (MEMS), nanotechnological storage device, etc.), and communication mediums (e.g., wired and wireless communications networks, local area networks, wide area networks, intranets, etc.). It is to be appreciated that the embodiments described herein may be implemented using software, hardware, firmware, or combinations thereof.

The cloud computing system 600 of FIG. 6 is provided only for purposes of illustration and does not limit the invention to this specific embodiment. It is appreciated that a person skilled in the relevant art knows how to program and implement the invention using any computer system or network architecture.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Components may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

The invention claimed is:

1. A system for outputting content associated with a space, the system comprising:

a wearable device;

one or more sensors;

a processor; and a non-volatile, non-transitory memory operatively coupled to the one or more sensors and the processor, the processor operative to:

receive, via said one or more sensors, spatial telemetry data;

analyze, via said processor, said spatial telemetry data;

identify one or more physical objects in a physical environment;

generate content including one or more virtual objects corresponding to the one or more physical objects detected in the physical environment, wherein each virtual object comprises a three-dimensional digital representation of the corresponding physical object including geometry and operational parameters;

associate, with each virtual object, a set of multi-step instructions comprising steps for maintaining, installing, or repairing the one or more physical objects;

output said content via a display of the wearable device such that a user may interact with the virtual objects by manipulating the three-dimensional representation to retrieve or display information corresponding to the space;

record, via the one or more sensors, real-world video of the user physically performing each step on the corresponding physical object to yield a recording; and store the recording in the non-volatile, non-transitory memory.

2. The system of claim 1, wherein said space is a rubber finishing line.

3. The system of claim 1, wherein said display is at least partially see-through.

4. The system of claim 1, wherein said wearable device is at least one of a hat and a helmet.

5. The system of claim 1, wherein said one or more virtual objects correspond to one or more components of a machine.

6. The system of claim 5, wherein said one or more components comprise at least one of a bolt, a washer, a nut, a frame, and a wear strip.

7. The system of claim 5, wherein said machine is a rubber baler.

8. The system of claim 1, wherein said generating step further includes accessing a library to obtain said one or more virtual objects corresponding to said one or more physical objects.

9. The system of claim 1, wherein said content further includes training information, said training information linked to the one or more virtual objects for training the user to operate said one or more physical objects.

10. The system of claim 1, wherein said processor is further operative to capture one or more data points associated with an interaction between the user and at least one of the physical objects and the virtual objects.

11. The system of claim 10, wherein said one or more data points correspond to at least one of gaze, gesture, position, orientation, and movement of the user.

12. The system of claim 1, wherein said outputting step further includes superimposing said one or more virtual objects on said one or more physical objects.

13. The system of claim 1, wherein said virtual objects are configured to model one or more parameters associated with said physical objects, wherein said parameters include at least one of a movement, a speed, and an operation.

14. The system of claim 1, wherein said output of content is an image.

15. The system of claim 14, wherein said image is generated from drawings.

16. The system of claim 1, wherein said output of content is a hologram.

17. The system of claim 1, wherein said output of content is in the form of or generated from a digital twin.

18. The system of claim 1, wherein said output of content is a series of images.

19. The system of claim 1, wherein the output step further includes guiding a user to manipulate one or more physical objects corresponding to said one or more virtual objects.

20. The system of claim 1, wherein said multi-step instructions include user-selectable virtual controls configured to navigate between sequential steps, including at least a control to advance to a next step and a control to return to a previous step.

* * * * *